Patented Nov. 9, 1926.

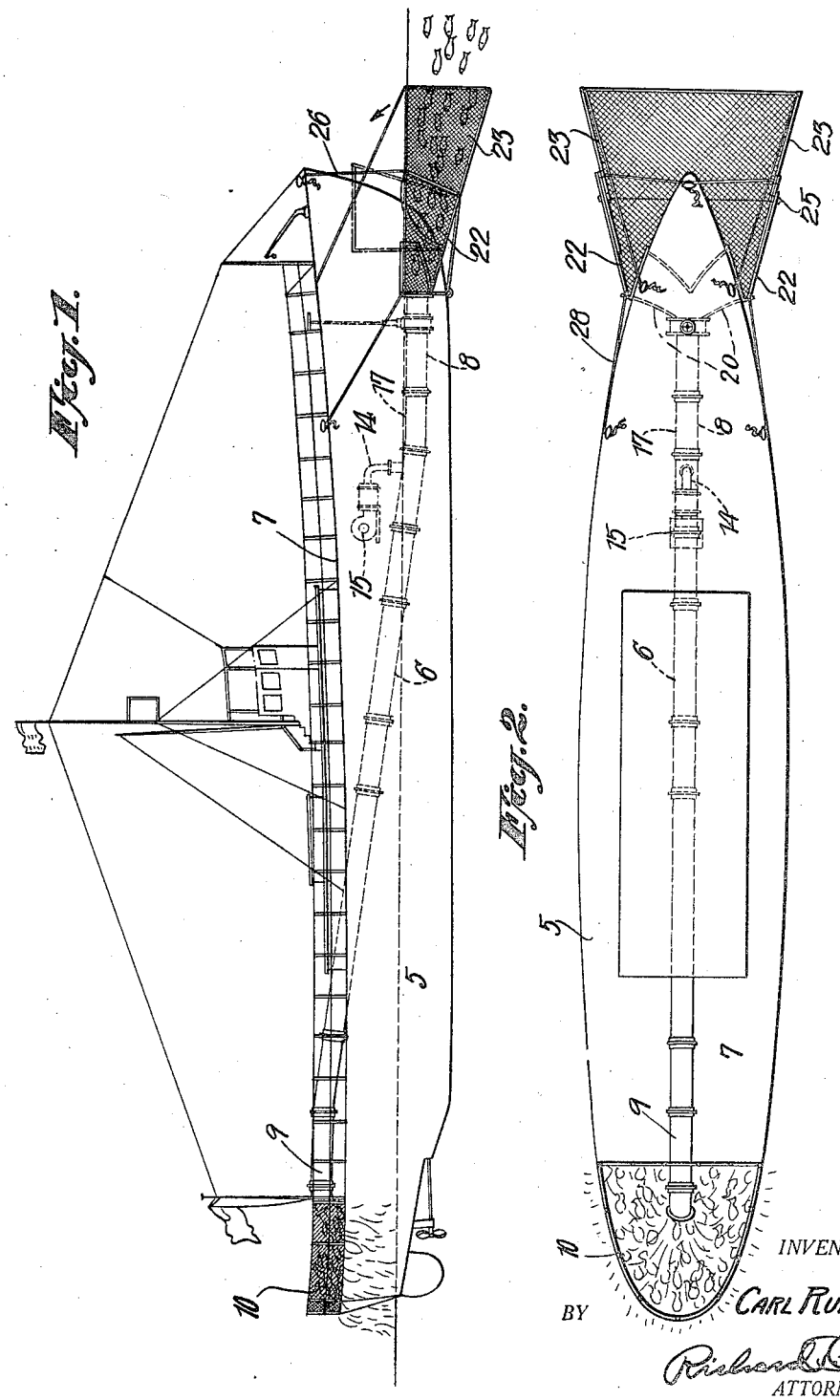

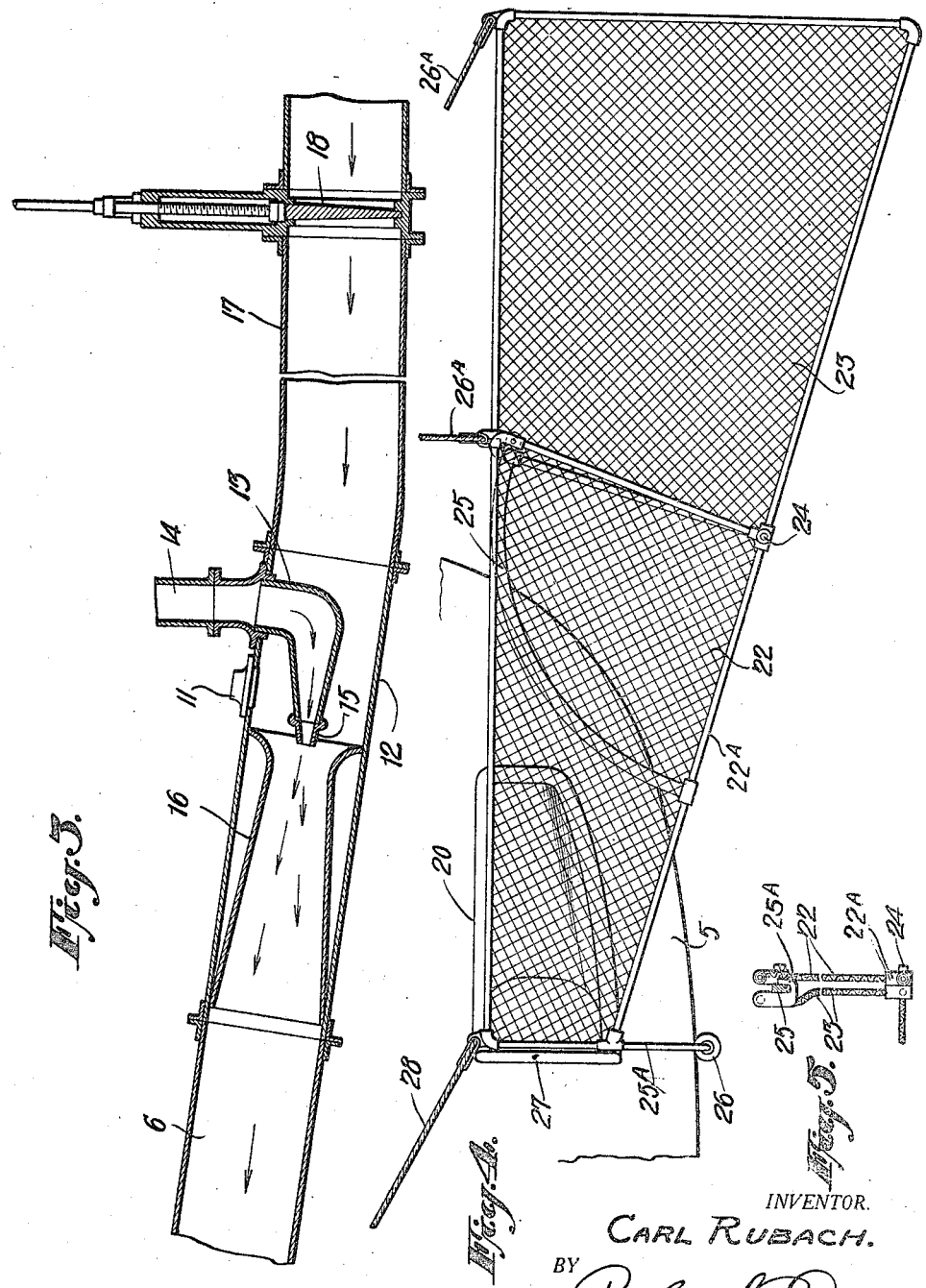

1,606,668

UNITED STATES PATENT OFFICE.

CARL RUBACH, OF JACKSONVILLE, FLORIDA, ASSIGNOR OF ONE-HALF TO JAMES E. GALLIGAN, OF NEW YORK, N. Y.

HYDRAULIC FISHING BOAT.

Continuation of application Serial No. 548,376, filed March 31, 1922. This application filed June 4, 1925. Serial No. 34,980.

This invention relates to a hydraulic fishing boat and has for its principal object to provide a novel and improved means positioned within the interior of a vessel for trapping fish as the same proceeds upon its course.

This application is a continuation of application Serial No. 548,376, filed March 31, 1922.

One of the objects of my invention is to provide a vessel with a longitudinally extending tube positioned with the interior of the same and extending from the bow to the stern including a novel and improved net which may be raised and lowered to the required depth from the bow of the vessel so as to trap the fish, especially when proceeding against current and in the path of a school of fish.

A continued object of my invention is to provide a hydraulic fishing boat of the size and character used in deep sea fishing wherein the vessel is provided with a sectional tube extending from the lower portion of the bow, rearwardly and upwardly to the stern, including a novel and improved adjustable net at the front end of said tube and a fishing trap at the rear end of the tube.

To enable others skilled in the art to fully comprehend the underlying features of my invention that they may embody the same in the various modifications in structure and relation contemplated, drawings depicting a preferred form have been annexed as a part of this disclosure and in such drawings, similar reference characters denote corresponding parts throughout all the views, of which, Figure 1 is a perspective view showing the vessel and the position of the tube with respect to the front net and rear trap.

Figure 2 is a plan view.

Figure 3 is a detail view of a section of the tube showing the gate valve and the nozzle therein.

Figure 4 is a detail view of the arrangement of the adjustable net.

Figure 5 is a further detail view of the guiding means for raising said net.

Referring now to the drawings, wherein like reference characters designate corresponding parts throughout all the views, 5 designates in its entirety a conventional type of sailing vessel preferably driven by Diesel engine so as not to cause disturbance in fishing waters. Within the vessel, I have provided the sectional tube 6 which extends downwardly from the main deck 7 and substantially horizontal as indicated at 8 near the front or bow of the vessel. The rearward end 9 of the tube is also disposed substantially horizontal with the deck and leads to a trap 10, permitting the water to flow overboard and trap the fish as the same are driven upwardly through the tube in the manner subsequently to be described. The tube is preferably constructed of a plurality of sections so that the same may be replaced or easily repaired and to that purpose, I have provided a manhole 11 in one of said sections so that access may be gained to the interior of the tube. The section 12 containing the manhole 11 is further provided with a nozzle 13 in communication with a pipe or lead 14 connected to a centrifugal pump 15 so that as the water flows into the tube, the same may be forced upwardly and consequently decrease the resistance offered by the water trapped in the tube during the progress of the vessel. The restricted opening 15 of the nozzle communicates with a throat 16 in the section adjacent the section 12 thus causing a swift current and effectively forcing the water upwardly to the deck of the vessel.

The section 17 of the tube is provided with a gate valve 18, which may be raised and lowered in any well known manner from the deck when it is desired to exclude water from the tube as when sailing under normal conditions and the front net is raised. A Y-shaped connection 20 at the front end of the tube 6 is disposed so as to cause the fish entering the front net to enter the tube and the suction created by the centrifugal force will cause the fish to pass upwardly in the current and stream to be discharged into the trap 10.

The rear section 22 of the catching net is formed of a tubular frame 22$^A$, the sides and bottom of which are connected by a strong wire mesh which is of sufficient strength to resist any tendency to dislodge it from its position. The front section frame 23 of the net is pivotally connected as at 24 to the front edge of the frame 22$^A$ and is adopted to swing on the guide rail 25 through the medium of an extension 25^A on the frame 23, when the said front section is raised and lowered by the cables 26^A leading to the deck of the vessel and the front section of the net is shown in its elevated position with dotted lines on Figure 1. The rear frame 22 of the net is further provided with a rod 25^A having a roller 26 on the bottom thereof, which engages the sloping bottom of the vessel, the bottom acting as a wedge to maintain the net in rigid position against a plate 27 when the cables 28 are drawn upon. By releasing the cables 28, the sections 22 and 23 may be raised as an entirety by cables 26^A, in which instance the roller 26 will ride along the bottom or bow of the vessel and consequently, the entire net will be raised from the water. It will also be observed that the net is of such a length as to extend considerably below the bow of the vessel to meet an oncoming school of fish and that the front net section 23 may be raised and lowered to the desired degree as fishing necessities may require.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention, what I claim as new and desire to secure by United States Letters Patent is:—

1. In combination, a boat, a tube extending longitudinally through the boat terminating at its bow and stern, a pump, an outlet from the pump situated in the tube intermediate its ends, said outlet forming a suction means for forcing the water rearwardly through the tube whereby resistance to progress of boat is decreased, and a foraminous trap mounted at the stern end of said tube.

2. In combination, a boat, a tube extending longitudinally through the body of the boat, said tube being partially below the water level line, a trap at the stern and opposite end of the tube and means within said tube to force the water rearwardly and decrease the resistance offered during the progress of the boat.

3. In combination, a boat, a tube extending longitudinally through the body of the boat, the major portion of said tube being normally below the water level line, a trap at the stern end of the tube but above the said normal water level line, and suction means within said tube to force the water rearwardly and decrease the resistance offered during the progress of the boat.

4. In combination, a boat, a tube extending longitudinally through the body of the boat, and having a portion thereof disposed normally below the water level line, a trap at the stern end of the boat and positioned above the water level line, a pump within the body of the boat and tube to force the water rearwardly and decrease the resistance offered during the progress of the boat.

5. In combination, a boat, a tube extending longitudinally through the body of the boat, the rear end of the tube being disposed above the normal water level line, a trap positioned at the said rear end of the tube, a centrifugal pump mounted within the body of the boat and a pump inlet leading into said tube to force the water rearwardly and decrease the resistance offered during the progress of the boat, and Y-shaped inlet leading to said tube.

6. In combination, a boat, a tube extending longitudinally through the body of the boat, the rear end of said tube being normally disposed above the normal water level line, an adjustable net positioned at one end of the boat and said tube, a trap at the rear end of the tube and disposed above the normal water level line, and a centrifugal pump positioned in the boat and said tube, substantially intermediate the ends thereof to force the water rearwardly and decrease the resistance offered during the progress of the boat.

7. In combination, a boat, a water inlet of substantial diameter extending longitudinally through the body of the boat, a water outlet and trap disposed in a plane above the inlet, and means between the inlet and outlet to force the water rearwardly and decrease the resistance offered during the progress of the boat.

8. In combination, a boat, a water inlet of substantial diameter at the bow of the boat, a water outlet and fish trap constructed and arranged in a plane above the said inlet, and centrifugal means within the body of the boat to force the water rearwardly and decrease the resistance offered during the progress of the boat.

9. In combination, a boat, a water inlet of substantial diameter at the bow of the boat, and water outlet and fish trap disposed in a plane above the inlet, a hingedly connected net supported by the boat in front of the inlet, and centrifugal pump operating means within the body of the boat to force the water reawardly through the outlet and decrease the resistance offered during the progress of the boat.

10. In combination, a boat, a tube extending longitudinally through the boat terminating at its bow and stern, a pump, an outlet from the pump situated in the tube interminate its ends, a trap mounted at the stern end of said tube, a net carried at the forward end of the vessel and positioned to cover the inlet end of said tube, and means for raising the net to a position against the bow of the boat.

11. In combination, a boat, a tube extending longitudinally through the body of the boat, the rear end of the tube being disposed above the normal water level line, a trap positioned at the rear end of the tube, a Y-shaped inlet leading to said tube and disposed at the bow of the boat, a net positioned in front of said Y-shaped inlet, and means for raising a portion of said net up against the bow of the boat.

12. In combination a boat, a water inlet of substantial diameter extending longitudinally through the body of the boat, a water outlet and trap disposed in a plane above the inlet, and means between the inlet and outlet to force the water rearwardly and decrease the resistance offered during the progress of the boat, a movable net positioned at the bow of the boat and in front of the inlet, whereby fish are directed into said inlet and means for folding the net up into position against the bow of the boat when the same is not in use.

In testimony whereof I affix my signature.

CARL RUBACH. [L. S.]